Mar. 6, 1923.
F. H. GEORGE
BELT
Original Filed Jan. 31, 1916   2 sheets-sheet 1
1,447,243
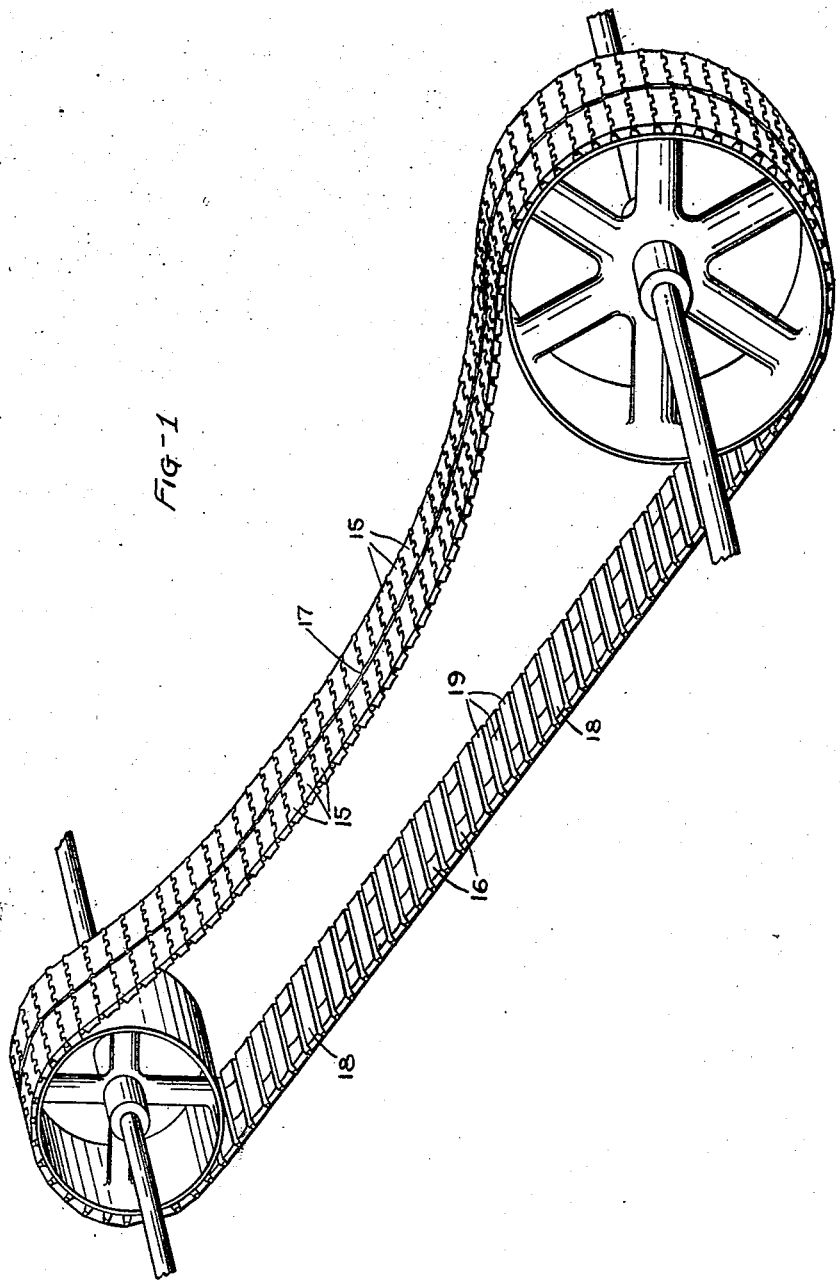
INVENTOR:
FREDERICK H. GEORGE.
By Whiteley and Ruckman
ATTORNEYS.

Mar. 6, 1923.
F. H. GEORGE
BELT
1,447,243
Original Filed Jan. 31, 1916   2 sheets-sheet 2
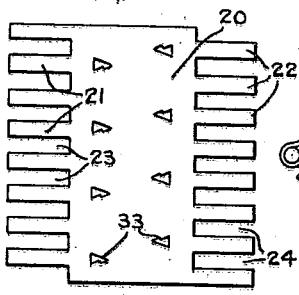
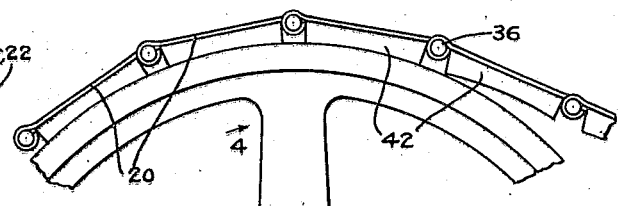
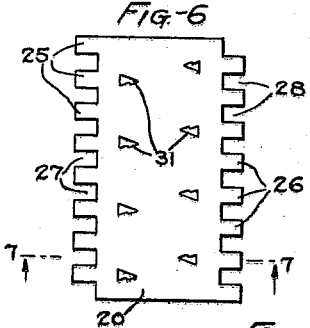
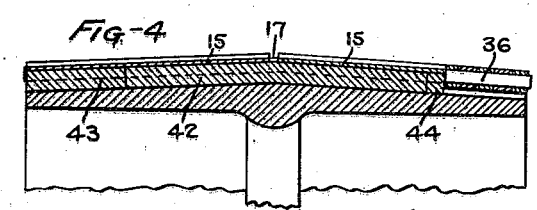
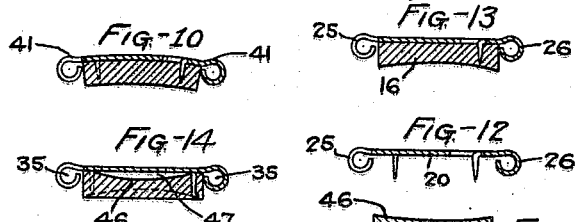
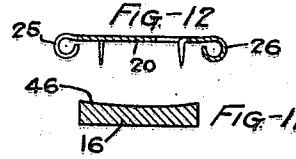
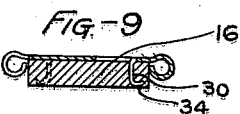
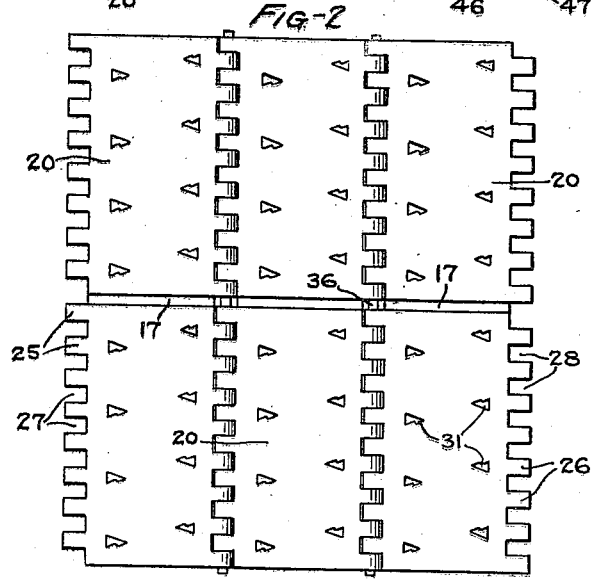
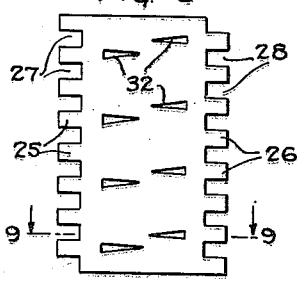
INVENTOR:
FREDERICK H. GEORGE.
BY Whiteley and Ruckman
ATTORNEYS.

Patented Mar. 6, 1923.

1,447,243

UNITED STATES PATENT OFFICE.

FREDERICK H. GEORGE, OF MINNEAPOLIS, MINNESOTA.

BELT.

Continuation of application Serial No. 75,279, filed January 31, 1916. This application filed February 21, 1921. Serial No. 446,879.

*To all whom it may concern:*

Be it known that I, FREDERICK H. GEORGE, a citizen of the United States, residing at Minneapolis, in the county of Hennepin and State of Minnesota, have invented certain new and useful Improvements in Belts, of which the following is a specification.

My invention relates to belts and has for its object to provide a running flat belt of any desired width in which the tension element shall comprise flexibly interconnected plates of metal and the friction element shall comprise small facing blocks of leather, asbestos, rubber, fabric, wood, composition or any desired substance having body and friction capacity and which is sufficiently cheap and available for the purpose. One form of friction element which I find very efficient for the purpose is leather, and since the friction blocks of the belt will severally be of small area, what is known as scrap leather and various forms of leather not available for the manufacture of all leather belts may be advantageously employed.

It is well known that the driving efficiency of a belt is directly proportional to the weight of the belt, the heavier the belt for a given width the less the slippage, and the more efficient the transmission of power. In all leather belts the weight of the belt for any given width must necessarily depend upon the thickness of the belt, and thus we have belts single thickness, two-ply, three-ply, etc. It further is impractical to make leather belts of more than a given thickness because compression of one side and tension on the other, as the belts go around the pulleys, tend to break the belts. It is further true that, with the rapidly increasing cost of leather, it is impracticable to increase the weight of leather belts because of the high cost thus involved. Manufacturers have thus resorted to the use of lighter belts than the character of work really requires, and have sought to offset the lack of weight of the belt by the use of belt tighteners. This involves additional elements to be installed and kept in repair and also has an injurious effect upon the belt.

In the belt of my invention, ample weight is provided by the use of metallic backing plates, while materially decreasing the cost of the belt and increasing the tensile strength thereof without sacrificing flexibility, so that such a belt will run smoothly and regularly and the use of a belt tightener be entirely dispensed with. The metallic backing plates also are not affected, as leather belts are by heat and dampness, and are particularly effective where the belt is employed in connection with hot metal or where bits of hot metal are likely to fall upon the exposed surface of the belt, as in connection with hot saws and similar machines. The metal plates protect the friction blocks secured to them, whether of leather or other material, and said friction blocks in turn effectively unite series of the metal plates transversely so as to provide metal backed belts of any desired width which are yet flexible across their width, so that the belt will adapt itself to the configuration of pulleys having a crown.

In carrying out my invention, the backing plates are formed of sheet metal with fasteners stamped from the body of the sheet metal which enter the friction facing blocks and secure the same to the plate. It will be clear that when two of said plates are placed end to end and a single friction block is secured to each of said plates extending across the space between the abutting ends, the two plates will be flexibly secured together by the friction strip. Under these conditions, the plates may be relatively small or of limited size. In practice, any desirable width of belts may be fabricated by making the sections of a sufficient number of plates placed transversely, which sections will always be transversely flexible along the center line for all pulleys which are provided with a crown.

The facing blocks or strips are preferably of a relatively narrow width, which may be anywhere from five-eighths of an inch to one and three-eighths inches or more, and these strips may be of any convenient length. The backing plates will have a surface area similar in extent to that of the backing strips, the plates being formed with hinging portions dove-tailing or interlocking by which the successive plates are hingedly secured together. On account of the narrow width of the facing strips, they may, if desired, be used with flat surfaces which would become slightly concave from use. Preferably, however, the engaging surface of the friction blocks or strips will be concaved in about the arc of the circle struck on the radius of the smallest pulley over which the belt is designed to run; and this concaving may be affected upon the facing strips alone or in conjunction with the backing plates.

The full objects and advantages of my invention will appear in connection with the detailed description thereof, and are particularly pointed out in the claims.

In the drawings illustrating the application of my invention in one form,—

Fig. 1 is a diagrammatic perspective view of a belt embodying the improvements of my invention as the same appears when in operation. Fig. 2 is an enlarged plan view of a belt such as shown in Fig. 1 viewed from outside of the belt, that is, so as to show the metal backing. Fig. 3 is an edge view of a portion of the belt shown in Fig. 2 as the same passes upon and along the surface of a pulley. Fig. 4 is a transverse section on line 4—4 of Fig. 3. Fig. 5 is a plan view of a sheet metal blank from which one of the backing plates is made. Figs. 6 and 7 are plan and edge views, respectively, of a single backing plate and a facing block secured thereto with one form of fastener stamped from the body of the metal plate. Figs. 8 and 9 are similar views showing another form of fastener. Fig. 10 is an edge view of a belt section showing the concaving of the friction surface by bending both the plate and the block. Fig. 11 is an edge view of a belt section showing concaving of the facing block alone. Figs. 12, 13 and 14 are segregated views showing another manner of concaving the friction surfaces. Fig. 15 is an edge view of a modified form of backing plate.

The belt illustrated in Fig. 1 is a six inch driving belt running over crowned pulleys. As shown, this comprises backing plates 15 and friction strips or blocks 16. The backing plates run in two series separated by a longitudinal central space 17, and the friction strips are either integral across the entire inside face of the belt, as indicated at 18, or are formed of a number of small pieces, as indicated at 19; but all of the strips have central pieces running across the space 17 so as to tie the series of backing plates together to form a continuous belt.

The backing plates are formed of sheet metal. As shown in Figs. 5, 6 and 7, the plates are first cut out so as to leave a rectangular center portion 20 of a width equal to that of the facing strips employed and of a length equal to the width of the belt where a single strip extends clear across the belt. For belts of other widths, especially where the belt is to be transversely flexible so that it will be accommodated to a crowned pulley, the plates may be of various lengths, and each plate is preferably one-sixty-fourth of an inch less in length for each inch of the width of the belt. That is, where plates are employed to make a six inch belt, as shown in Fig. 1, such plates will preferably be two and sixty-one-sixty-fourths of an inch in length. This would theoretically make the space 17 for preventing frictional engagement of the ends of the plates three-thirty-seconds of an inch wide, but in practice it is found convenient to make this space one-sixteenth of an inch in width, and have the belt run one-thirty-second of an inch narrow. The plates are stamped out with tongues 21 and 22 on opposite sides thereof between intervening slots or notches 23 and 24. The tongues 21 and 22 are then formed into loops 25 and 26, leaving intervening notches 27 and 28. The loops 25 of one plate will enter notches 28 of an adjacent plate and the loops 26 will enter the notches 27 of the adjacent plate, the whole forming a dove-tailed arrangement, as shown in Fig. 2.

The plates are first secured to the facing strip or strips, and this is accomplished by means of fasteners 29 or 30 which are stamped out of the body 20 of the plate and which have the shape indicated by the stamped-out portion of material at 31 in Figs. 5 and 6, or at 32 in Fig. 8. It is obvious that with proper die forms the plates may be placed in position to receive the facing strips, which can be forced upon the fasteners 29 and 30, causing said fasteners to enter the body of the facing strips. Fasteners 29 will not reach the outer surface of the strips 16 and will hold said strips in position by reason of the barbs 33 of said fasteners. The fasteners 30 pass clear through the facing strip 16 and are clinched back into the body of the strip as indicated at 34 in Fig. 9.

Where two or more backing plates are required to make a single section across the width of the belts, as indicated in Figs. 1 and 2, the facing strips are applied to the plates as they are held in position by the form and secure the plurality of backing plates together to form a single alining section. The interlocking loop members 25 and 26 will have their apertures 35 in alinement, and by the use of a pintle 36 of a size to fit said apertures 35 the several sections may be flexibly secured together. The pintles 36 may be of any desired material but I have found in practice that a pintle formed of rawhide twisted and formed into the shape of a rod and specially treated and hardened provides a peculiarly effective connecting member, particularly in belts made transversely flexible for running over crowned pulleys, as the rawhide pintle is thus capable of yielding freely along the line of separation 17 between the ends of the plates. As shown in Fig. 4, two backing plates 15 are held in transverse alinement by a compound backing plate 19 formed of a central strip 42 which bridges the gap 17 between the ends of the backing plates 15, and ties said backing plates together to form a completed section, shorter strips 43 and 44 completing the entire friction block or plate. It is obvious that any desired number of backing plates may be united end to end in this manner to form belt sections of any desired length for a belt of corresponding width.

The tongues 21 and 22 forming the loop members 25 and 26 may be turned over tangentially from the surface portion 20 of the backing plates, as shown at 40 in Fig. 15, or said loop members may be slightly raised above the plane of the surface portions 20, as indicated at 41 in Figs. 7 and 10.

Because of the comparative narrow width of the friction facing strips, the belt will work very well where said strips are provided with merely plane faces, and in use such faces will become slightly concave where they run over the pulleys, forming good gripping surfaces. It is, however, practicable, and is contemplated as a part of my invention, to engage the friction surfaces of the facing strips so that said surfaces are concave across the same or in the longitudinal line of the belt in substantially the arc of a circle struck on the diameter of the smallest sized pulley upon which the belt is designed to run. This concaving may be effected, as in Fig. 10, by pressing one of the sections with the facing strip thereto, as shown in Figs. 7 or 9, into the form shown in Fig. 10. In this case both the backing plate and the friction facing strip are bent, the relatively stiff metal backing plate serving to hold the section in the position into which it has been shaped. This is a very efficient arrangement as it does not reduce the thickness of the friction facing strip at any point and allows the full weight of material to be employed.

Another method which also is very efficient is shown in Figs. 11, 12 and 13. In this case the block, as shown in Fig. 11, is first cut away or concaved, as indicated at 46. This concaving is done on the flesh side of the block to permit the good friction surface of the hair side to be employed next to the pulley. The concaving of the block is reversed by suitable pressure and then the block is applied to the fabricated plate shown in Fig. 12, and produces the construction of Fig. 13. Or, the block 16 after being concaved as indicated at 46 may be applied without change to a plate such as shown in Fig. 12 so as to leave a space 47 between the back surface of the facing block and the inside of plate 15, as shown in Fig. 14. In this case, as the belt is run over the pulley, the facing strip may yield inwardly to bring the engaging surface thereof into a shape to match the arc of the pulley over which the belt is being run, the concavity of the engaging surface being variable in accordance with the particular size of pulley with which it is used.

The advantages of my belt are obvious and have been fully pointed out in the description heretofore given. The sheet metal backing plates are cheaply manufactured and in combination with suitable pintles, particularly cylindrical rawhide pintles as above referred to, provide at a moderate cost a maximum tensile strength with adequate weight and at the same time reasonably limited thickness. The facing strips may be made from scrap leather, asbestos, or other suitable material which meets the particular requirements. The system of building up the wider belts by the use of a plurality of backing plates tied together transversely by facing strips is a feature of my belt which is highly advantageous since it gives transverse flexibility, permitting wide belts to be used on crowned pulleys.

I am aware that my invention may be practiced in modified and equivalent forms differing in some degree from those shown and described herein, and I do not wish to be limited to the exact form and character of belt herein described.

I claim:

1. A flat belt comprising a multiplicity of metal-backed sections hingedly connected together throughout the length of the belt, said sections comprising a plurality of metallic plates connected transversely for flexible movement across lines transverse to the longitudinal extent of the belt.

2. A flat belt consisting of a multiplicity of sections flexibly connected together throughout the length of the belt, each of said sections comprising a plurality of metallic plates connected transversely for flexible movement across lines transverse to the longitudinal extent of the belt, and friction strips secured to said metallic plates.

3. A flat belt consisting of a multiplicity of sections flexibly connected together throughout the length of the belt, each of said sections comprising a plurality of metallic plates connected transversely for flexible movement across line transverse to the longitudinal extent of the belt, and friction strips concaved transversely of the belt and secured to said metallic plates.

4. A flat belt consisting of a multiplicity of sections flexibly connected together throughout the length of the belt, each of said sections comprising a plurality of metallic plates connected transversely for flexible movement across lines transverse to the longitudinal extent of the belt, and flexible friction strips extending across the longitudinal space between said metallic plates and secured thereto.

5. A flat belt comprising a multiplicity of sheet metal backing plates hingedly connected together to form the tension element of the belt, and a corresponding number of friction elements each independently secured to the respective backing plates to form the pulley-engaging surface of the belt, said sheet metal plates comprising fastener elements stamped from the body of sheet metal, said fastener elements having pointed ends and projecting portions near said ends for entering the friction elements to hold the same positioned upon the plates.

6. A flat belt comprising a multiplicity of sections, each section having a plurality of sheet metal backing plates and a friction facing strip holding said backing plates in transverse alinement, and means flexibly connecting the back plates of the sections to form the tension element of the belt.

7. A flat belt comprising a multiplicity of metal backing plates each formed with a plurality of spaced and closed loops, the loops of each plate interlocking with the complemental loops on the adjacent plates, a flexible pintle extending through all of the loops of each adjacent interlocking pair of plates to form the joints, and friction strips secured to each of said plates.

8. A flat belt comprising a multiplicity of metal backing plates each formed with a plurality of spaced and closed loops, the loops of each plate interlocking with the complemental loops on the adjacent plates, a pintle formed of rawhide extending through all of said loops of each adjacent interlocking pair of plates to form the joints, and friction strips secured to each of said plates.

9. A flat belt comprising a multiplicity of sections, each section having a plurality of sheet metal backing plates placed end to end and a friction facing strip holding said backing plates in transverse alinement, each of said backing plates being provided with a plurality of loops on each of its ends, the loops of each plate interlocking with the complemental loops of each adjacent plate, and flexible pintles extending through all of the loops of the joints.

10. A flat belt comprising a multiplicity of sections, each section having a plurality of sheet metal backing plates placed end to end and a friction facing strip holding said backing plates in transverse alinement, each of said backing plates being provided with a plurality of loops on each of its ends, the loops of each plate interlocking with the complemental loops of each adjacent plate, and pintles of rawhide extending through all of the loops of the joints.

In testimony whereof I hereunto affix my signature.

FREDERICK H. GEORGE.